(12) United States Patent
Ellis et al.

(10) Patent No.: US 9,070,411 B1
(45) Date of Patent: Jun. 30, 2015

(54) WRITABLE SERVO OVERLAP ZONES

(71) Applicant: Seagate Technology LLC, Cupertino, CA (US)

(72) Inventors: Timothy Ellis, Tonka Bay, MN (US); Joshua W. Christensen, Savage, MN (US); Ravi Hebbar, Longmont, CO (US); John Purkett, Longmont, CO (US); Justin Won, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/935,545

(22) Filed: Jul. 4, 2013

(51) Int. Cl.
*G11B 5/09* (2006.01)
*G11B 20/14* (2006.01)
*G11B 5/596* (2006.01)
*G11B 20/12* (2006.01)

(52) U.S. Cl.
CPC ............ *G11B 20/14* (2013.01); *G11B 5/59661* (2013.01); *G11B 5/59627* (2013.01); *G11B 5/59633* (2013.01); *G11B 5/59655* (2013.01); *G11B 2020/1287* (2013.01)

(58) Field of Classification Search
None
See application file for complete search history.

(56) References Cited

U.S. PATENT DOCUMENTS

| | | | |
|---|---|---|---|
| 5,612,833 A * | 3/1997 | Yarmchuk et al. | 360/75 |
| 5,642,244 A | 6/1997 | Okada | |
| 6,122,133 A | 9/2000 | Nazarian | |
| 6,515,813 B2 * | 2/2003 | Kitazaki et al. | 360/51 |
| 6,636,377 B1 * | 10/2003 | Yu et al. | 360/78.07 |
| 6,952,320 B1 * | 10/2005 | Pollock et al. | 360/77.04 |
| 7,012,773 B2 * | 3/2006 | Ashikaga et al. | 360/48 |
| 7,405,893 B2 * | 7/2008 | Bi et al. | 360/48 |
| 7,502,197 B1 * | 3/2009 | Chue | 360/77.08 |
| 7,679,851 B1 * | 3/2010 | Sun et al. | 360/48 |
| 7,982,993 B1 * | 7/2011 | Tsai et al. | 360/48 |
| 8,031,429 B2 * | 10/2011 | Gerasimov | 360/78.09 |
| 8,116,023 B1 * | 2/2012 | Kupferman | 360/51 |
| 8,619,379 B2 * | 12/2013 | Nonaka et al. | 360/48 |
| 8,724,245 B1 * | 5/2014 | Smith et al. | 360/51 |
| 2006/0018051 A9 * | 1/2006 | Chiao et al. | 360/31 |
| 2013/0010382 A1 | 1/2013 | Nonaka | |
| 2013/0010383 A1 | 1/2013 | Nonaka | |
| 2013/0010388 A1 | 1/2013 | Nonaka | |
| 2013/0010389 A1 * | 1/2013 | Nonaka et al. | 360/135 |
| 2013/0033783 A1 * | 2/2013 | Gerasimov | 360/78.14 |
| 2013/0182350 A1 * | 7/2013 | Kawabe et al. | 360/51 |
| 2014/0055883 A1 * | 2/2014 | Dhanda et al. | 360/77.08 |

* cited by examiner

*Primary Examiner* — Dismery Mercedes
(74) *Attorney, Agent, or Firm* — Cesari & Reed LLP; Kirk A. Cesari; Christian W. Best

(57) ABSTRACT

Systems and methods are disclosed for writable servo zone overlap regions on a disc memory. An apparatus may comprise a controller configured to determine a servo gate (sgate) timing for an overlap zone including servo patterns of a first servo super zone and a second servo super zone of a disc memory, the sgate timing based on servo pattern timing for the first servo super zone and the second servo super zone. The controller may initiate writing to the overlap zone based on the sgate timing. The controller may also reduce the impact of servo pattern frequency change between zones by calculating a trajectory error prior to the crossing, and providing 1/X of the trajectory error into a servo feedback loop for a following X servo sampling points.

20 Claims, 14 Drawing Sheets

WRITABLE SERVO OVERLAP ZONES

BACKGROUND

This disclosure relates to data storage devices (DSDs), and particularly to DSDs employing disc storage media.

SUMMARY

In certain embodiments, an apparatus may comprise a controller configured to determine a first servo gate (sgate) timing for a first overlap zone including servo patterns of a first servo super zone and servo patterns of a second servo super zone of a data storage medium, the first sgate timing based on servo pattern timing for the first servo super zone and the second servo super zone. The controller may be further configured to initiate writing data to the first overlap zone based on the first sgate timing.

In certain embodiments, a device may comprise a disc data storage medium including N servo super zones including a first servo super zone and the second servo super zone, the servo super zones including a plurality of tracks and having servo patterns. The device may also comprise a controller configured to determine a first servo gate (sgate) timing for a first overlap zone including servo patterns of the first servo super zone and servo patterns of the second servo super zone, the first sgate timing based on servo pattern timing for the first servo super zone and the second servo super zone. The controller may initiate writing data to the first overlap zone based on the first sgate timing.

In certain embodiments, a device may comprise a disc data storage medium including a first servo super zone and the second servo super zone, the servo super zones including a plurality of tracks and having servo patterns. The device may also comprise a controller configured to control movement of a transducer head over the disc data storage medium, including determining when the transducer head will cross from the first servo super zone to the second servo super zone, calculating a trajectory error prior to the crossing, the trajectory error due to a change in servo pattern frequency between the first servo super zone and the second servo super zone, and providing 1/X of the trajectory error into a servo feedback loop for a following X servo sampling points.

DETAILED DESCRIPTION

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure. It is also to be understood that features of the various embodiments can be combined, exchanged, or removed without departing from the scope of the present disclosure.

Disc drives can store data to disc data storage media. Data can be read from or stored to a disc storage medium by aligning a read or write head over data tracks concentrically arranged on a surface of the disc. A disc may be divided into a plurality of concentric zones, with each zone containing a plurality of data tracks. Due to changes of servo data configurations between zones and eccentricities between zone boundaries and the movement of the transducer head, efficiently storing user data to tracks near zone boundaries may be difficult. Devices and methods of the present disclosure may be used to efficiently store user data near zone boundaries.

Figure 1:
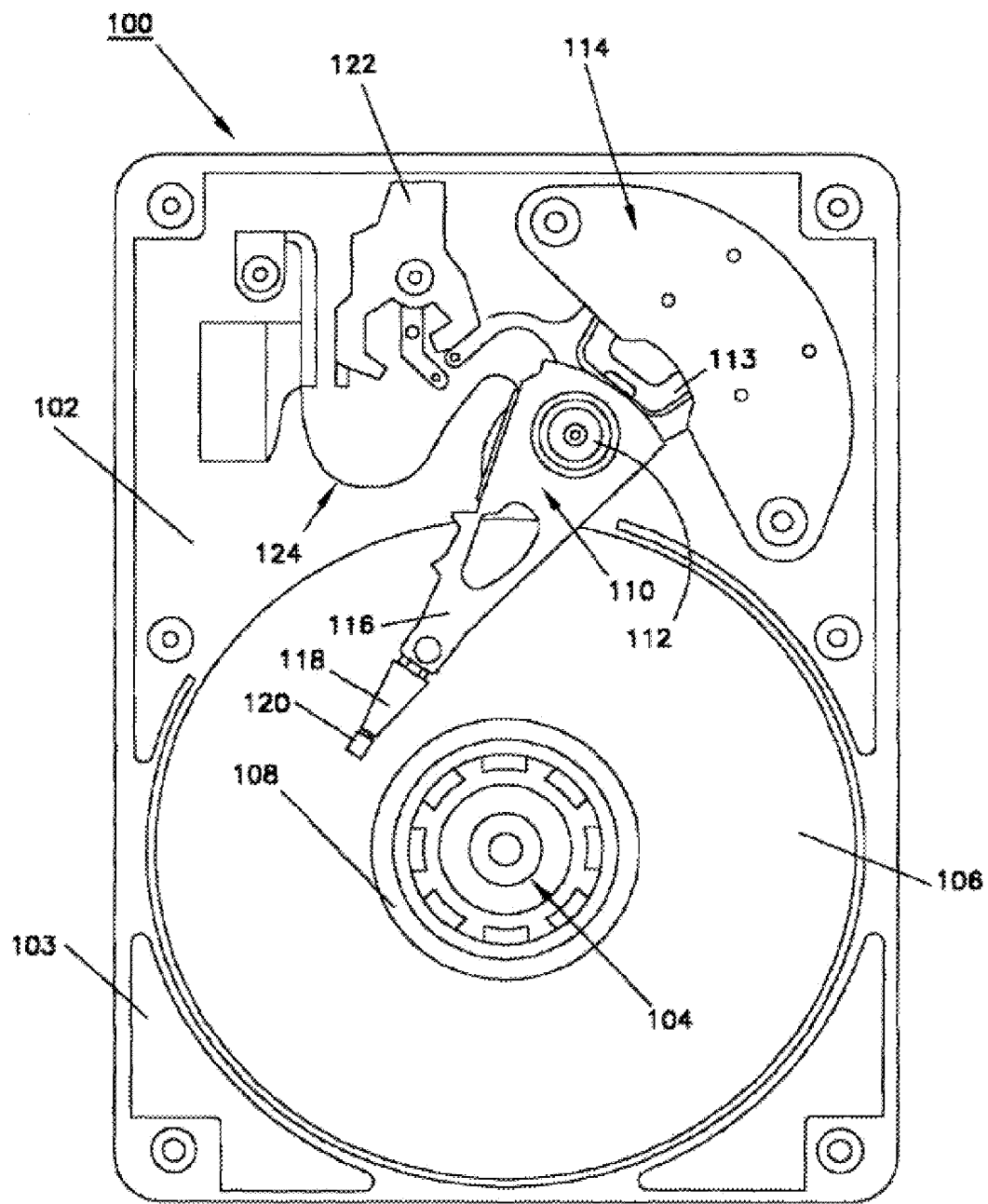
FIG. 1 is a diagram of a system for writable servo zone overlap regions, in accordance with certain embodiments of the present disclosure.

FIG. 1 shows a top plan view of an example disc drive 100 employing writable servo overlap zones. Disc drive 100 may include a housing with a base plate 102 to which various disc drive components may be mounted. A cover may attach to base plate 102 to form a sealed environment for the disc drive components. Disc 106 may be attached to spindle 104 using clamp 108. Disc 106 may include servo patterns used to define data tracks on one or more surfaces of disc 106. A spindle motor (not shown) may be adapted to rotate spindle 104 and disc 106 at a desired speed. Actuator assembly 110 may be mounted to base plate 102 for rotation about a cartridge bearing assembly 112. Actuator assembly 110 may be adapted to rotate in response to a control current supplied to coil 113 of voice coil motor 114. Actuator assembly 110 may include a rigid track accessing arm 116 which extends over disc 106. The arm 116 may include an associated flexible suspension assembly 118 extending therefrom. Transducing head 120 may be fixed to the suspension assembly 118. In some disc drives 100, there may be one head per disc surface, such as a top surface and a bottom surface, or each surface of a plurality of discs in a disc stack. For purposes of clarity, only one head 120 and one disc surface 106 are shown in FIG. 1.

Head 120 may include a transducer that magnetically interacts with the disc recording surfaces, and a slider assembly that supports the head 120 upon an air bearing established by wind currents set up by the high speed rotation of disc 106. A latch assembly 122 can be used to secure actuator assembly 110 when disc drive 100 is deactivated. Flex circuit assembly 124 can enable head 120 and coil 113 to electrically communicate with disc drive control circuitry (not shown), which for example may be on a printed circuit board mounted to the underside of base plate 102.

The discs used in disc drives may include circular data tracks which extend circumferentially around each disc. These data tracks may be defined by radially oriented servo patterns or servo tracks that contain servo information. The servo information can define the boundaries and centerlines of each of the data tracks. The servo data can be used to position the head 120 over tracks of the disc 106, such as by seeking to a desired track or by following over the centerline of the desired track. The Servo patterns may be written to a disc after the disc has been installed into a drive, or prior to installation into a drive.

Figure 2A:
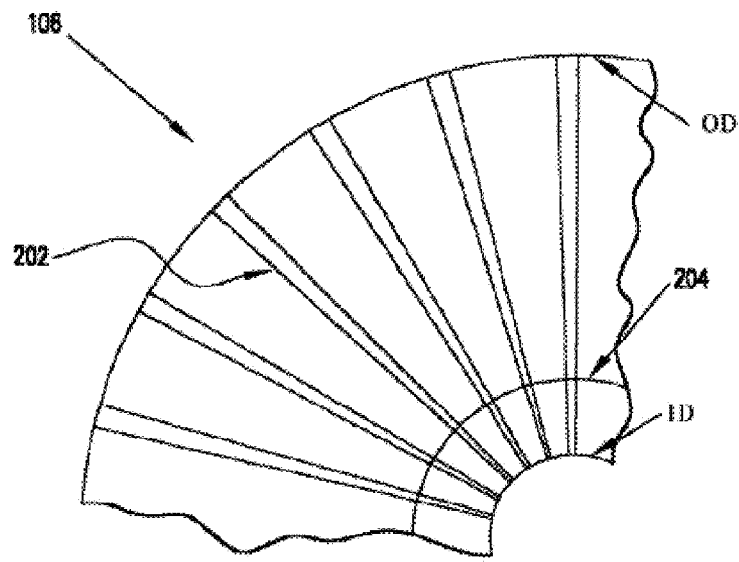
FIG. 2a is a diagram of a system for writable servo overlap zones, in accordance with certain embodiments of the present disclosure.

The servo patterns may be written to a surface of the disc 106 in a plurality of radially extending servo sectors 202, as shown in the portion of a disc 106 shown in FIG. 2a. Each of the servo sectors 202 can contain servo information that is stored in various servo fields. The servo information identifies the location of "real" servo tracks, such as servo track 204, by a track number or track ID. "Real" tracks, as used herein, may refer to the tracks defined by the servo information written to the disc. Tracks 204 may be sequentially numbered in accordance with their radial position, for example where track zero may be located adjacent to an outer diameter (OD) of disc 106 and a last track may be located adjacent to an inner diameter (ID) of disc 106. An example of a portion of a data track 204, shown in FIG. 2b, may include servo sectors 202 interspersed between data areas 206, in which data such as user data can be stored. Servo sectors 202 can provide coarse positioning information (such as a track ID to locate a desired track), as well as fine positioning information to indicate a position of a head 120 relative to a center line of a given data track 204. For example, burst patterns or null-type servo patterns can be used for coarse positioning.

Figure 3:
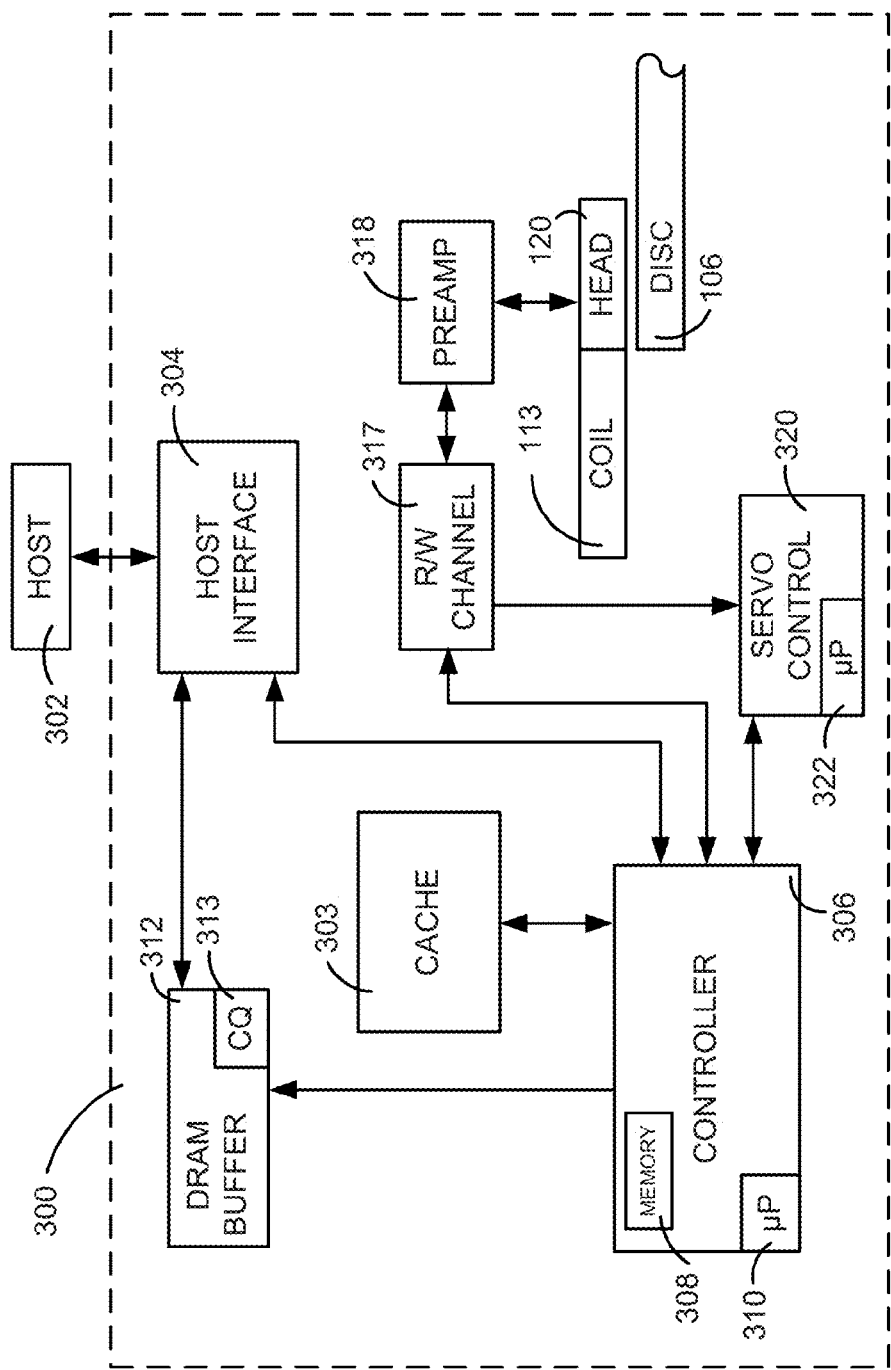
FIG. 3 is a diagram of a system for writable servo overlap zones, in accordance with certain embodiments of the present disclosure.

FIG. 3 depicts a diagram of a system for writable servo overlap zones, generally designated 300. Specifically, FIG. 3 provides a functional block diagram of an example disc drive data storage device (DSD) 300. The DSD 300 may be a data storage device such as the disc drive 100 shown in FIG. 1. More generally, the DSD 300 can be a removable storage device, a desktop computer, a laptop computer, a server, a tablet computer, a telephone, a music player, another electronic device, any other device which may be used to store or retrieve data, or any combination thereof.

The data storage device 300 can communicate with a host device 302 via a hardware or firmware-based interface circuit 304 that may include a connector (not shown) that allows the DSD 300 to be physically removed from the host 302. The host 302 may also be referred to as the host system or host computer. The host 302 can be a desktop computer, a laptop computer, a server, a tablet computer, a telephone, a music player, another electronic device, or any combination thereof. In some embodiments, the DSD 300 may communicate with the host 302 through the interface 304 over wired or wireless communication, or by a local area network (LAN) or wide area network (WAN). In some embodiments, the DSD 300 can be a stand-alone device not connected to a host 302, or the host 302 and DSD 300 may both be part of a single unit.

The buffer 312 can temporarily store data during read and write operations, and can include a command queue (CQ) 313 where multiple pending operations can be temporarily stored pending execution. The DSD 300 can include a cache memory 303, which can be either volatile memory such as DRAM or SRAM, or non-volatile memory, such as NAND Flash memory. The cache 303 can store recently or frequently read or written data. A DSD 300 containing multiple types of nonvolatile storage mediums, such as a disc 106 and Flash 303, may be referred to as a hybrid storage device.

The DSD 300 can include a programmable controller 306 with associated memory 308 and processor 310. Further, FIG. 3 shows the DSD 300 can include a read-write (R/W) channel 317, which can encode data during write operations and reconstruct user data retrieved from disc(s) 106 during read operations. A preamplifier circuit (preamp) 318 can apply write currents to the head(s) 120 and provides pre-amplification of read-back signals. A servo control circuit 320, which can include a processor 322, may use servo data to provide the appropriate current to the coil 113 to position the head(s) 120. The controller 306 can communicate with the servo control circuit 320 to move the head(s) 120 to the desired locations on the disc(s) 106 during execution of various pending commands in the command queue 313.

Figure 2B:
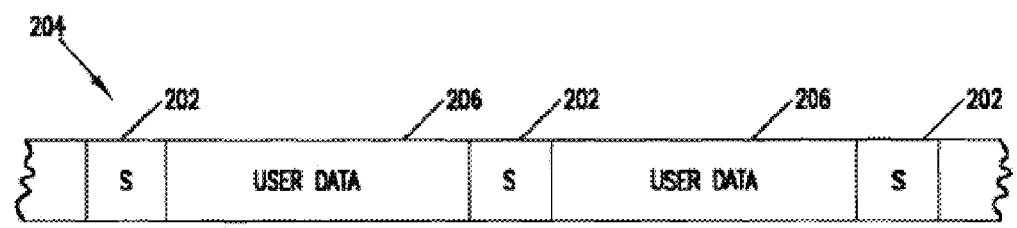
FIG. 2b is a diagram of a system for writable servo overlap zones, in accordance with certain embodiments of the present disclosure.

The "real" tracks 204 of a disc as defined by the servo sectors 202 of FIGS. 2a and 2b may not be perfectly concentric with the axis of rotation of the disc. The servo sectors may be written to the disc before or after the disc is installed into a drive. In the case of "post-written" discs, with servo data written after installation by the transducer head of a drive, uncontrolled factors such as bearing tolerances, spindle resonances, and the like, tend to introduce errors in the location of the servo information. Also, if the reference servo pattern used to write the final servo pattern was written externally then that can induce eccentricity. As a result, each track is typically not perfectly concentric with the axis of rotation of the disc, but rather exhibits certain random, repeatable variations which are sometimes referred to as repeatable runout (RRO).

A higher tracks-per-inch data density of a disc may be achieved by writing the servo sectors to the discs prior to their installation in a disc drive using highly precise servo writers. Although these "pre-written" tracks can result in an increase in the TPI of the disc, large RRO may result due to large eccentricity between the data tracks and the axis of rotation of the disc. This eccentricity may primarily stem from the re-mounting of the disc to the spindle motor of the disc drive. In addition, the RRO that affects disc drives using post-written discs may also be present when these pre-written discs are used. These differences between the written tracks and the axis of rotation of a disc may make it difficult for a transducer head to accurately and efficiently follow the written tracks as the disc spins.

Drives may be configured to address the eccentricity between the servo tracks and the axis of rotation of a disc by employing "virtual tracks," which may not perfectly coincide with the "real" tracks defined by the servo data. Virtual tracks may be referred to as virtual concentric aligned tracks (VCATs). Systems and methods for employing virtual tracks are detailed in U.S. Pat. No. 6,952,320 (the '320 patent), which is incorporated herein by reference in its entirety. Other systems and methods may also be used by drives which may result in a transducer head not perfectly following servo-defined tracks.

Figure 4:
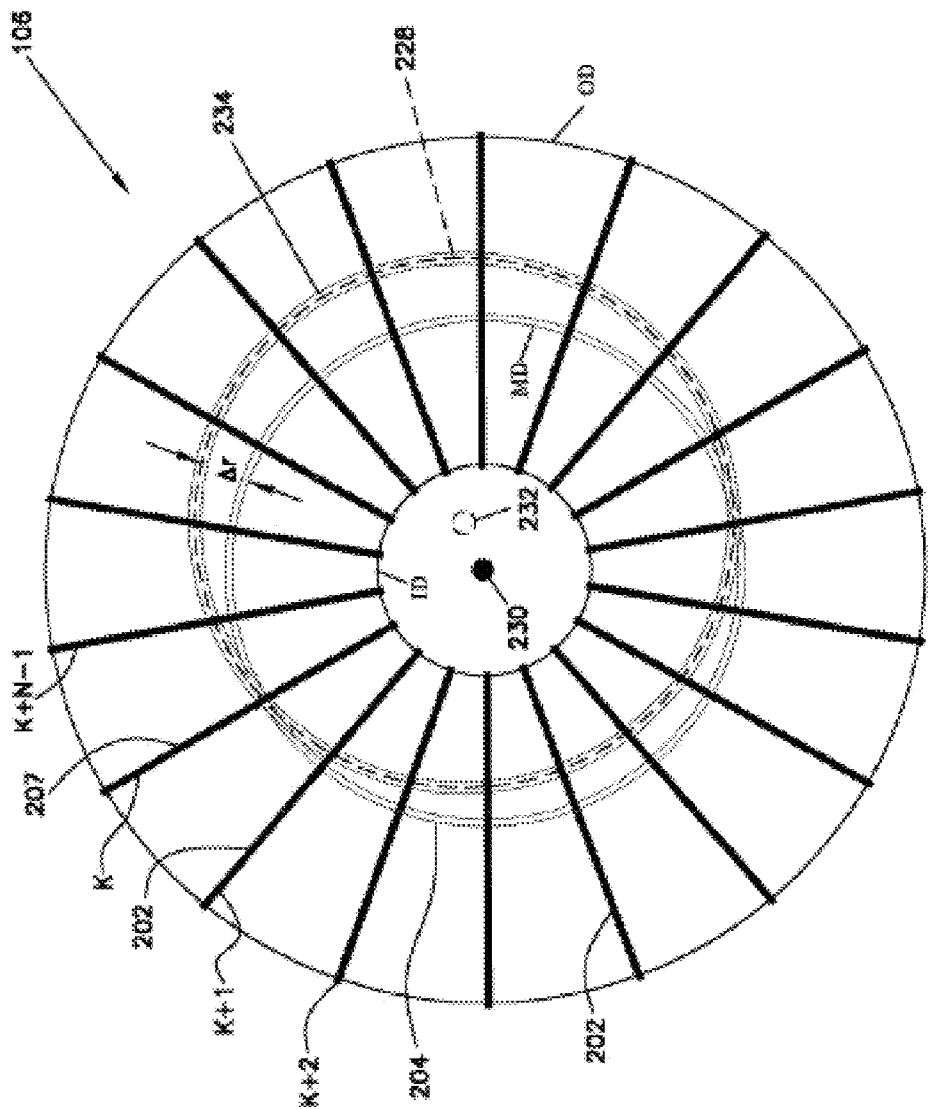
FIG. 4 is a diagram of a system for writable servo overlap zones, in accordance with certain embodiments of the present disclosure.

Turning to FIG. 4, an example system employing writable servo overlap sectors is depicted. FIG. 4 shows an example simplified illustration of a disc 106 showing the above-described misalignment between data tracks 204 (only one shown) defined by servo sectors 202 and a path 228 that a head 120 follows as disc 106 rotates. Data tracks 204 may be concentric with a servo track axis 230 and path 228 may be concentric with axis of rotation 232 of disc 106. A large degree of eccentricity may exist between data tracks 204 and path 228 due to the misalignment of servo track axis 230 and axis of rotation 232 when disc 106 is mounted to spindle 104 of disc drive 100. For example, misalignment on a pre-written disc can be in the range of 1000 micro-inches or more, which can result in a periodic or sinusoidal RRO that has significantly larger displacement magnitudes than the small and somewhat random RRO associated with discs having post-written servo tracks.

As mentioned above, the misalignment problem may be addressed by establishing "virtual" tracks 234 (only one shown), which may be substantially concentrically aligned with the circular path 228 and axis of rotation 232 of disc 106. As described in the '320 patent, this may be accomplished by compensating the servo control in a disc drive 100 with a compensation signal that eliminates the position errors that may arise during track following operations due to the RRO and causes a head 120 to follow virtual tracks 234. Virtual tracks may allow for efficient performance of a drive by utilizing virtual tracks rather than compensating for misaligned servo-defined tracks; however, this may also result in the head not exactly following the servo-defined tracks. A head following a virtual track may read servo sectors from different tracks, which can, among other things, result in different frequencies between servo sectors.

Some drives employ discs divided into a plurality of concentric zones, where each zone may include a plurality of tracks. Rather than employing a series of wedge-shaped radial servo patterns that extend from the ID to the OD of the disc, with the pattern narrower at the ID and wider at the OD as seen in FIG. 2a, zone-based servo technology may include physically different servo patterns at certain points across the radius. For example, the servo pattern size for each zone may be more uniform, rather than expanding from ID to OD. In some examples, servo patterns of adjacent zones may be slightly offset from one another circumferentially, rather than being oriented in a straight radial line. In some examples, different zones may have different servo pattern frequencies. The disc zoning implementation can provide a reduction in servo format overhead, increased recording space available for user data, improvement in the recording subsystem characteristics, and reduction in servo pattern time-dependent decay.

Because these zones may be defined by the servo data recorded on the disc, some virtual tracks may cross between two different zones, due to eccentricity between the virtual tracks and the servo pattern-defined zone boundaries. Due to the changing servo patterns, frequencies, or other characteristics between zones, drives may have difficulty efficiently storing data in these zone boundaries. The boundaries between zones, sometimes called zipper regions or overlap zones, may be "trimmed" to minimize the size of a non-writable boundary area. Trimming may include modifying or overwriting pre-written servo data in the boundary area with post-written servo data once the disc is installed in the drive. However, trimming may be undesirable. For example, a trimmed disc may be unusable if installed into another drive or device, because trimmed tracks on the disc may not match well with the new eccentricity caused by re-installation into another drive, and trimming may still result in an area of the disc that cannot be written efficiently. This could also require extensive reworking or modification of multiple discs used in each drive.

In example embodiments of a drive employing writable servo overlap zones, an adaptive algorithm can be applied to allow for efficient writing of user data in the zipper regions and without the need for trimming the servo data written on the disc. Further, physical demarcation of zones on the drive and an adaptive algorithm for handling varying servo patterns in different zones and zipper regions may enable modulation of servo sample rate on a zone-by-zone basis. That is, each zone could have a different servo sample rate while still allowing for data writing in the zipper regions between zones. This may further improve the format overhead by tailoring the servo sample rate in each zone to only the sample rate required for optimum control of the head position.

Figure 5A:
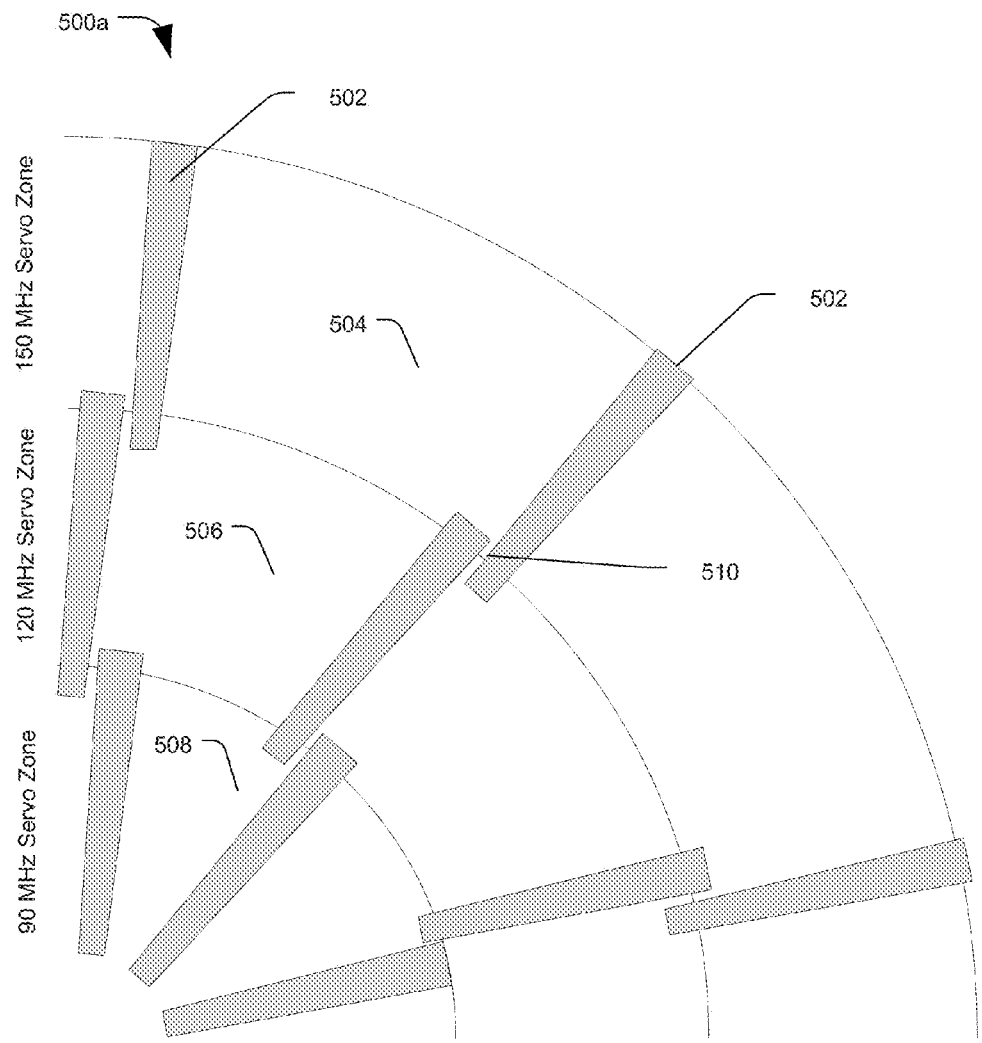
FIGS. 5a and 5b are diagrams of a system for writable servo overlap zones, in accordance with certain embodiments of the present disclosure.

Turning now to FIG. 5a, a portion of an example disc having writable servo overlap zones is depicted and generally designated 500a. In the example shown, disc 500a is divided into an outer diameter (OD) zone 504, a middle diameter (MD) zone 506, and an inner diameter (ID) zone 508. Each zone may have a number of servo track patterns 502. Each zone may have a different servo pattern frequency, such as 150 MHz for the OD zone 504, 120 MHz for MD zone 506, and 90 MHz for ID zone 508. This may be in contrast to discs where wedge-shaped servo patterns became wider from the ID towards the OD, with a relatively constant servo frequency. The wide servo patterns near the OD of such embodiments may result in faster thermal decay of servo data leading to loss of data integrity, and may also result in more disc space being devoted to servo sectors than may be necessary or desirable.

As further shown in example 500a, the servo patterns 502 between adjacent zones may not be radially aligned on the disc. Each pattern may be circumferentially offset from the pattern in adjacent zones. Further, in some examples the servo patterns 502 from both zones may extend into boundary regions, such as shown at 510, with the patterns approximately adjacent to each other. A virtual track near a zone boundary may include servo data from both of the bounding zones at one or more locations where the virtual zone path does not coincide with the pre-written servo-defined tracks.

Figure 5B:
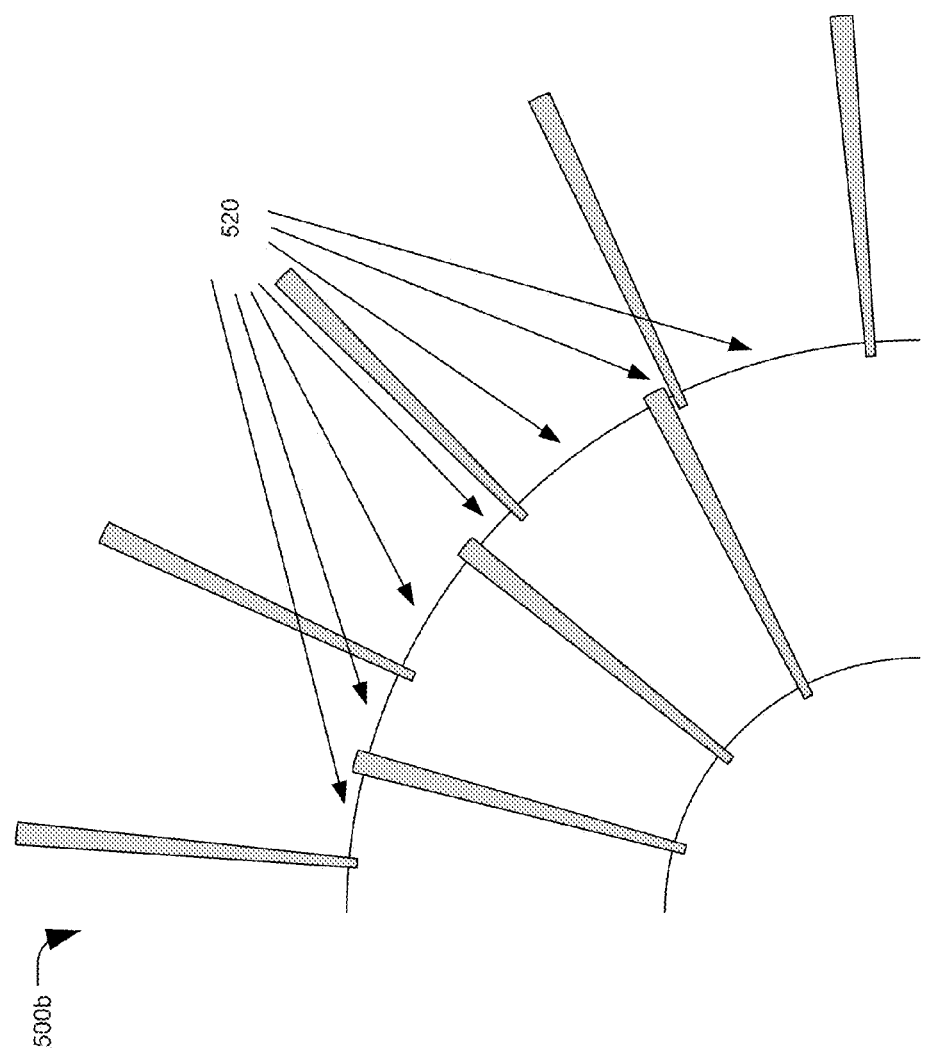

FIG. 5b depicts a portion of another example disc having writable servo overlap zones, generally designated 500b. Disc 500b depicts another example of servo sample rates varying by zone, with two adjacent zones depicted. In the embodiment 500b, the servo boundary regions may include servo patterns at different intervals around the revolution of the disc, but both patterns may be present in the boundary region. In this example, the servo patterns may not be generally adjacent to each other, as compared to FIG. 5a. As shown, the intervals between patterns need not be regular, and can be processed by a drive as the disc revolves. The two sample rate patterns could be the same servo pattern frequency, or could also have different pattern frequencies, as with the single sample rate adjacent patterns shown in FIGS. 5a, and 6a and 6b. User data may be recorded in the boundary region in the intervals between servo patterns 520, even when such intervals are irregular.

Figure 6A:
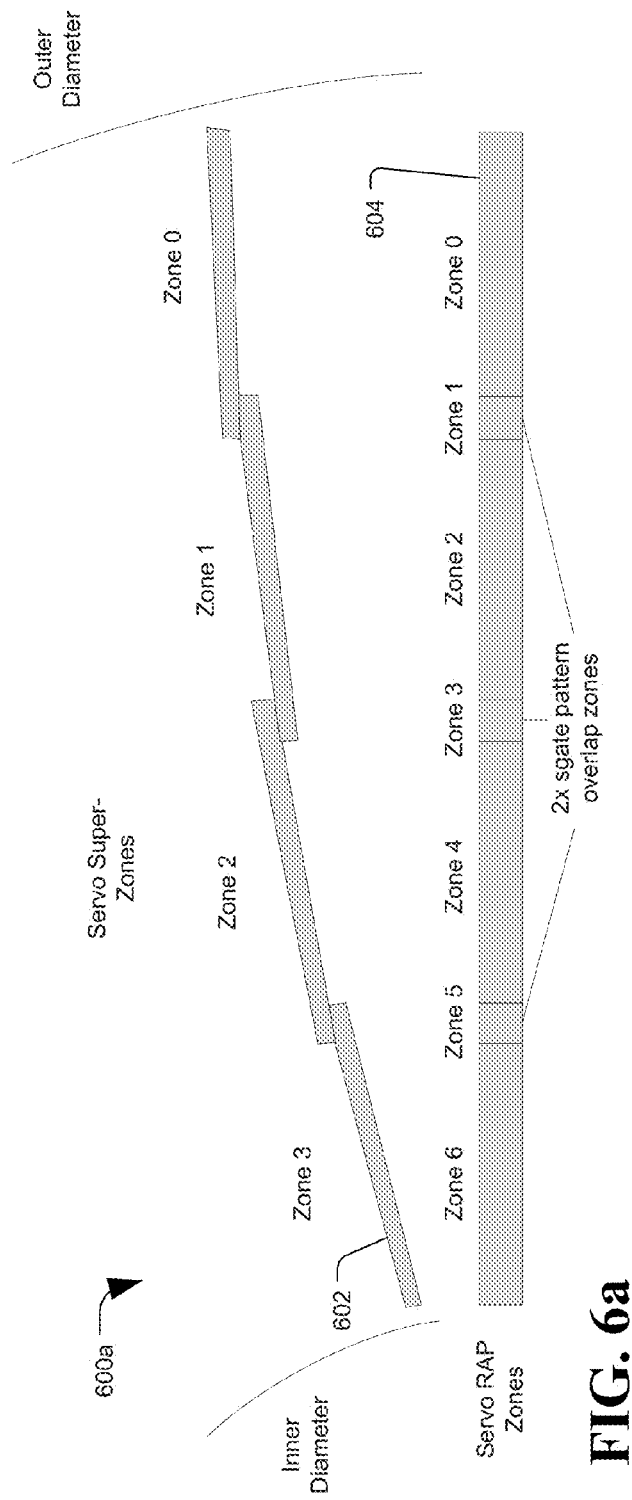
FIGS. 6a and 6b are a diagram and chart of a system for writable servo overlap zones, in accordance with certain embodiments of the present disclosure.

FIG. 6a depicts an example of a disc having writable servo overlap zones, generally designated 600a. The example of 600a is similar to the example of 500a, with servo patterns 602 spanning from an outer diameter of the disc to an inner diameter, across four zones, Zone 0 through Zone 3. These zones defined by the written servo patterns 602 may be referred to as "servo super-zones" or "super zones." Servo patterns 602 are shown overlapping to represent the boundary regions between zones where virtual tracks may read servo data from different zones.

A disc controller can use gate signals to control the behavior of read or write heads. These gates signals can control the behavior of an R/W channel and preamp for given sectors as the head moves across the disc. Gates may control which values and parameters the device uses to control the head and handle signals read from the disc. For example, a read gate signal may be used to have the head read user data. The controller may switch on a channel servo gate signal, or channel "sgate," to identify when to retrieve servo data from the disc. The controller may switch on the channel sgate when a servo signal is anticipated, which allows the system to read and interpret the servo patterns. A sequencer sgate may also be switched on when servo patterns are anticipated, which may prevent the servo data from being overwritten by preventing writing operations. Unless otherwise specified, "sgate" as used herein may refer to sequencer sgates. The sequencer sgate may protect the servo patterns and define where the servo patterns may begin and end. Therefore, being able to anticipate the servo frequency and servo pattern size is important for proper drive behavior. However, servo frequency may be unpredictable in the zone boundary regions because a virtual track may read servo patterns from different zones or multiple zones, creating frequency irregularity.

In some embodiments, a disc drive may start a factory process with some default sgate timing details, including sgate width and sgate zone-zone time offset, compiled into servo firmware. Special calibration tests in the factory may then measure zone-zone offset parameters including cross-track (Track ID) offset and down-track (time) offsets for each servo super-zone overlap region. These details may then be stored in flash memory and incorporated to generate appropriate sgate width and zone-zone time offsets. All of these details may end up in servo memory as servo adaptive parameters (SAP), and some of them in controller firmware memory as read/write adaptive parameters (RAP).

As discussed, the controller may use different parameters for timing and other head controls based on which zone a head is currently located over. These may be referred to as servo read/write adaptive parameter (RAP) zones. A drive may compensate for the servo pattern unpredictability in the zone boundary regions by designating additional servo RAP zones for those boundary regions. FIG. 6a shows a diagram of servo RAP zones 604 corresponding to the servo super zones and overlap zones of example disc 600a. Because the servo RAP zones may not directly correlate to the servo super-zones as written on the disc, the RAP zones may be referred to as "virtual zones." For example, rather than the four servo super-zones written on the disc, the drive may divide the disc into 7 servo RAP zones. Each servo super-zone may have a corresponding servo RAP zone, and there may be an additional servo RAP zone for each boundary region between the servo super-zones. For example, N servo zones may have N−1 boundary regions, and the number of servo RAP zones may be accordingly 2N−1.

The size of the overlap zones may be defined based on an amount of virtual tracks that may cross over zone boundaries. For example, the size of overlap zones may be based on a worst-case scenario of eccentricity between pre-written servo-defined tracks and virtual tracks, so that a drive need not be calibrated to the specifics of each particular disc. The irregularity or unpredictability of servo pattern frequencies in the boundary zones may be addressed by defining those zones with sgates based on the servo frequencies of adjacent non-overlap zones. For example, if two adjacent servo super-zones have servo patterns that are offset and circumferentially adjacent to each other (as shown in FIG. 5a), the overlap zone may use sgates of approximately 2× the timing length or "width" of the adjacent super-zones.

Figure 6B:
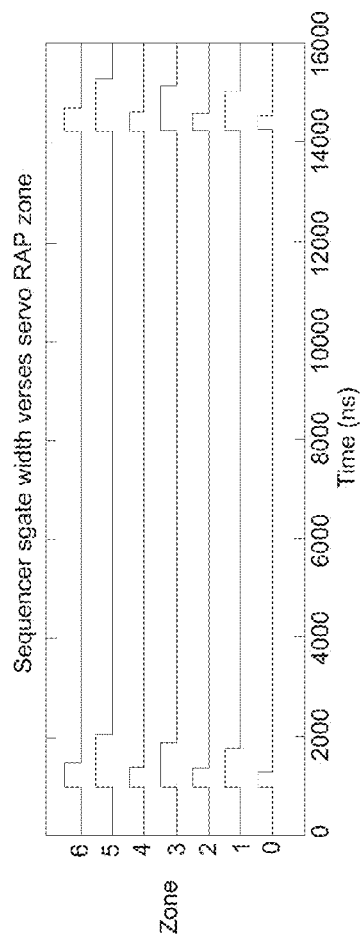

FIG. 6b depicts a chart of timing signals, or sgate widths, for the seven servo RAP zones shown in 604. The sequencer sgate widths for the overlap zones 1, 3, and 5 may be approximately twice as wide as the adjacent non-overlap zones 0, 2, 4, and 6. By defining the sgate width as approximately twice the width of non-overlapped zones, the sgate can account for instances where a virtual track reads servo data from either or both of the adjacent zones. The adjacent servo patterns depicted in FIGS. 5a (at 510) and 6a represent how the servo patterns in the overlap regions may be considered twice as wide as the servo patterns in the non-overlapped regions, because the servo patterns in those examples may be positioned next to each other in the overlap zones.

In an example, sequencer sgates may shrink towards the OD (zone 0) for non-overlap zones (e.g. even numbered servo RAP zones). This can happen when the servo patterns are not configured to become progressively wider towards the OD, causing the transducer head to pass over them more quickly as the disc spins relative to ID servo patterns. The sgate width of overlap zones (e.g. odd numbered servo RAP zones) may be equal to the combined width of the two adjacent even-numbered zones. So for example, the sgate width of zone 1 may be equal to the sgate width of zone 0 plus the sgate width of zone 2. This may result in the sgate width of the odd-numbered overlap zones shrinking towards the OD as well.

Figure 7A:
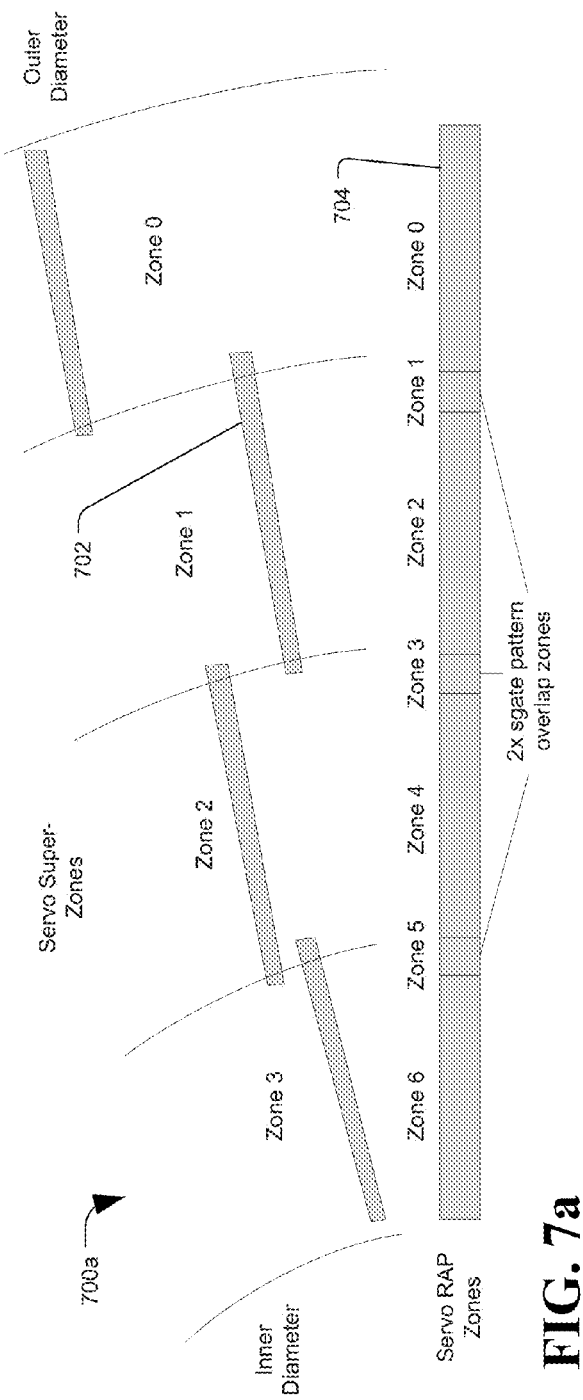
FIGS. 7a and 7b are a diagram and chart of a system for writable servo overlap zones, in accordance with certain embodiments of the present disclosure.

FIG. 7a depicts another example of a disc having writable servo overlap zones, generally designated 700a. The example of 700a is similar to the example of 500b, with servo patterns 702 spanning from an outer diameter of the disc to an inner diameter, across four servo super-zones, Zone 0 through Zone 3. Similar to FIG. 6a, a drive may divide the disc into multiple servo RAP zones 704, with the RAP zones for both the super-zones and the overlap zones between super-zones. Unlike in FIGS. 6a and 5a, the servo patterns on the disc may not be circumferentially flush or directly adjacent to each other in the boundary overlap zones.

Figure 7B:
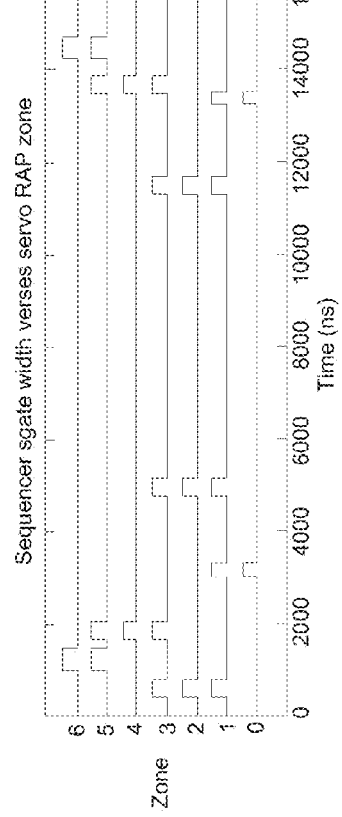

FIG. 7b depicts an example chart of timing signals for the seven servo RAP zones shown in 704. As with FIG. 6b, example sequencer sgates are shown that a drive may use to anticipate servo data regions within each zone. However, unlike FIG. 6b, since the servo patterns may not be circumferentially flush in the overlap zones, the sequencer sgates for the overlap zones (e.g. the odd-numbered zones) may not be simply twice as wide as the sgates of the non-overlap zones (e.g. the even-numbered zones). The sequencer sgates for overlap zones may be a combination of the sgates of both adjacent non-overlap zones, which may include irregularly timed sgates (e.g. having non-integral distribution). Sequencer sgates may be modulated in such a way to protect both patterns, and further, channel sgates (discussed further herein) may be modulated in such a way to select the desired sample rate pattern. User data may be stored in the portion of tracks in between the sequencer sgates (representing where servo patterns may be located), even if these track portions are not equally sized or spaced circumferentially around the disc within a zone.

Figure 8:
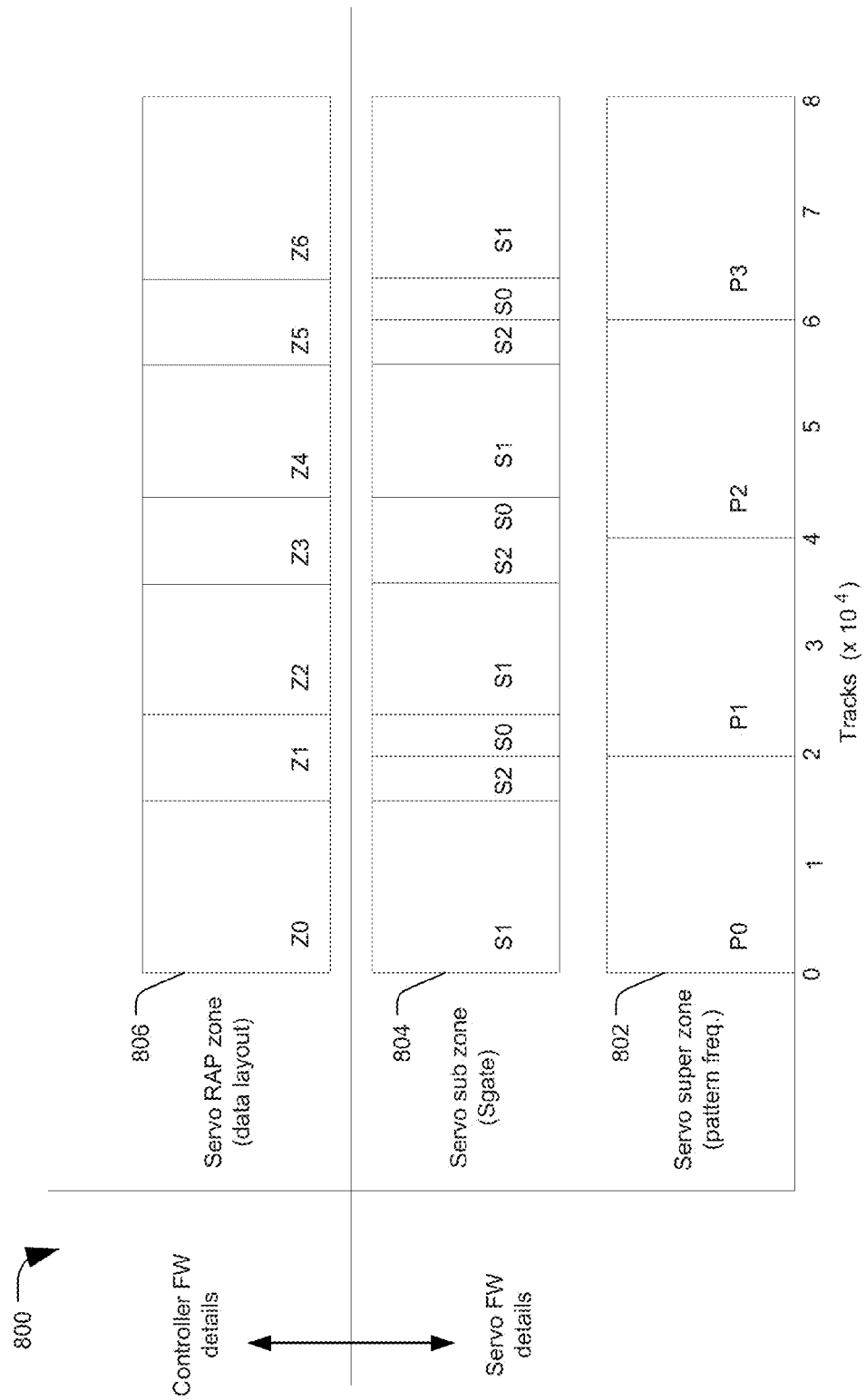
FIG. 8 is a chart of a system for writable servo overlap zones, in accordance with certain embodiments of the present disclosure.

FIG. 8 depicts an example chart 800 of zone designations for a system employing writable servo overlap zones. Chart 800 shows how the zones may be handled by controller firmware (FW) and servo firmware. The size of each zone may be represented as an approximate number of tracks in that zone in the example embodiment.

Diagrams 802 and 804 may identify how the servo FW handles the zones of a disc. Diagram 802 depicts an example of a series of four servo super-zones labeled P0 to P3, each with approximately 2×10$^4$ tracks. Diagram 804 depicts an example of servo sub zones, for example with varying sgate widths or frequency. Each non-boundary zone (e.g. with single-width sgates as in FIG. 6b) may be represented as an S1, while the boundary portions of each super-zone may be represented as S0 and S2. Diagram 806 shows an example of the servo RAP zone data formatting layout, which may define how RAP zones are spaced and data stored for those zones. Diagram 806 may contain 7 RAP zones, Z0 to Z6. The overlap servo RAP zones Z1, Z3, and Z5 may contain the boundary zones S0 and S2 from two different super-zones, treated as a single unique zone by the controller FW.

Figure 9:
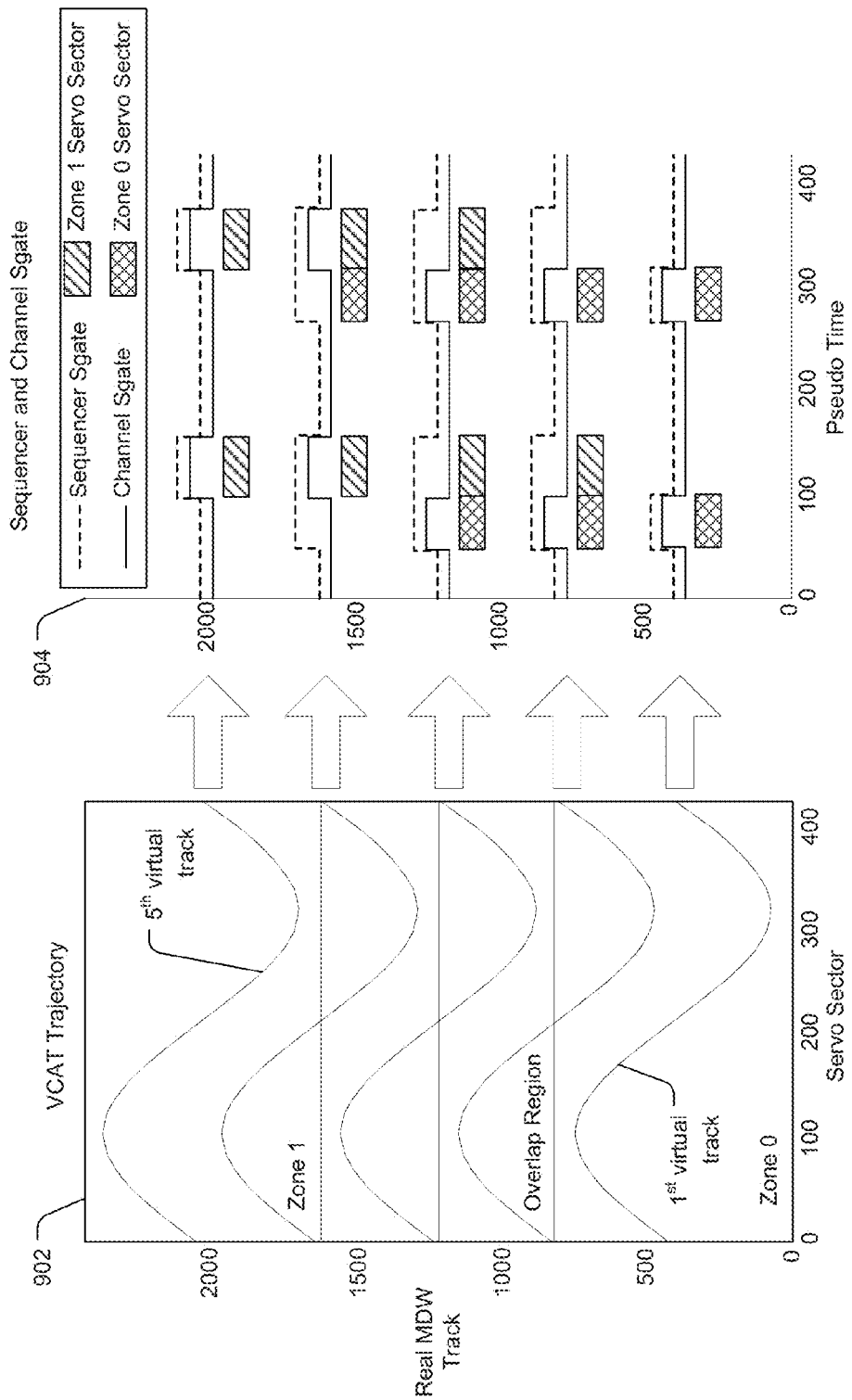
FIG. 9 is a chart of a system for writable servo overlap zones, in accordance with certain embodiments of the present disclosure.

Turning now to FIG. 9, diagrams of an example system employing writable servo zone overlap regions is depicted. Diagram 902 depicts Zone 0 and Zone 1, with an overlap region in between. The zones may be defined by the "real" tracks written by a multi-disc writer (MDW) and their corresponding servo patterns. The overlap region may be an area where virtual tracks may pick up servo data from more than one zone. Diagram 902 also depicts an example five virtual tracks (VCAT) trajectories (1$^{st}$ virtual track to a 5$^{th}$ virtual track), and how those trajectories may cross between zones.

Diagrams 902 and 904 help illustrate how the different virtual tracks may be handled by a drive. Diagram 902 may show an example path of virtual tracks, and how they may cross between regions. Diagram 904 shows an example illustrating which servo sectors each virtual track may read (i.e. which zone the servo sectors are being read from), and the corresponding sequencer sgate and channel sgate signals. 'Sequencer sgate' may sometimes be referred to as protection sgate, as it can prohibit writing and erasure of whatever is written to a disc while the sequencer sgate is active (e.g. what a transducer head passes over while the sgate is on). Channel sgate may be used to demodulate servo patterns. For example, while a channel sgate is active, servo data may be read and used for head positioning. In overlap regions where a head may pass over servo data from multiple zones, the drive may only activate the channel sgate while the head is passing over servo data from a selected zone, rather than reading the servo data from both zones. In other words, the sequencer sgate may define when data cannot be written, while the channel sgate may define when servo data should be read and demodulated.

For example, the 1$^{st}$ virtual track may be completely within Zone 0, and only include servo data from Zone 1. The 2$^{nd}$ virtual and 4$^{th}$ virtual tracks may cross into the overlap region for part of their trajectory, potentially on two servo patterns at a time for part of the trajectory, and on one servo pattern at a time for the rest of the trajectory. The 3$^{rd}$ virtual track may be entirely within the overlap region and may be on two servo patterns at a time, potentially for the entire trajectory. The 5$^{th}$ virtual track may be entirely within Zone 1 and only include servo sectors from Zone 1.

As diagram 904 illustrates, the drive may handle the 1$^{st}$ virtual track and the 5$^{th}$ virtual track with single-width sequencer sgates and channel sgates, as virtual tracks in those regions may not cross zone boundaries and may not include servo patterns from different zones. For virtual tracks that cross into the overlap region (i.e. virtual tracks 2 through 4), the sequencer sgate width may be set to account for the possibility of the track picking up servo data from both Zone 0 and Zone 1; e.g., with an sgate width of approximately 2× that of the sgates for tracks in non-overlapped zones. By setting the sequencer sgate to an approximate 2× width, the portion of each track covered by the sgate may not be used to store user data, even if a particular virtual track does not actually pass over two servo patterns for the entire track. For example, the 4$^{th}$ virtual track may only pass over two adjacent servo patterns for the second portion of its trajectory, but the drive may use a 2× width sgate for the entire track regardless and not use any of the sgate-defined intervals for storing data. This may account for any uncertainty in exactly where a given track may pass over two servo patterns, for example based on a worst-case scenario.

Although FIG. 9 depicts an "overlap region" between Zones 0 and 1, that region may not correspond directly to the overlap zones as shown in FIG. 6a through FIG. 8. For example, the overlap region of FIG. 9 has virtual tracks that may pass in and out of the overlap region (e.g. 2$^{nd}$ and 4$^{th}$ virtual tracks). Meanwhile, the overlap zones may be defined by a number of virtual tracks, and may include all virtual tracks that may partially cross over into the overlap region of FIG. 9 (e.g. 2$^{nd}$ through 4$^{th}$ virtual tracks). In other words, any virtual track that may partially cross into the overlap region and require a 2× width sequencer sgate may be fully contained within the overlap zones.

Each virtual track in an overlap zone may reliably read servo data from a particular zone, regardless of whether it also crosses the servo data from an adjacent zone. In the example of FIG. 9, the 2$^{nd}$ virtual track may always read servo data from Zone 0, the 4$^{th}$ track may always pick up servo data from Zone 1, and the 3$^{rd}$ virtual track can pick up servo data from Zone 0 or 1. As discussed, the channel sgate may be configured to direct when the drive collects servo information for head positioning from the reliable servo sector. That is, the data that is under the channel sgate may be used by the channel to collect servo information. The other servo pattern can be ignored because it is outside of the channel sgate, but they may both be 'protected' because both are covered by the sequencer sgate.

In an example embodiment, discs could be formatted (e.g. by a multi-disc writer MDW) with very large overlap regions, ensuring that all zones are categorized as overlap zones. For example, each servo super zone may have its own servo pattern and may greatly overlap adjacent servo super zones, and every track in each servo super zone may accordingly also contain a servo pattern from one or more adjacent servo super zones. In such embodiments, N servo super zones may result in N "virtual" zones, all of which may be overlap zones. In this example, all tracks may be configured with a 2× width sequencer sgates. This may be less space-efficient than alternating single-zones and overlap-zones, but it may simplify handling of the different zones by a data storage device at an interface level.

Figure 10:
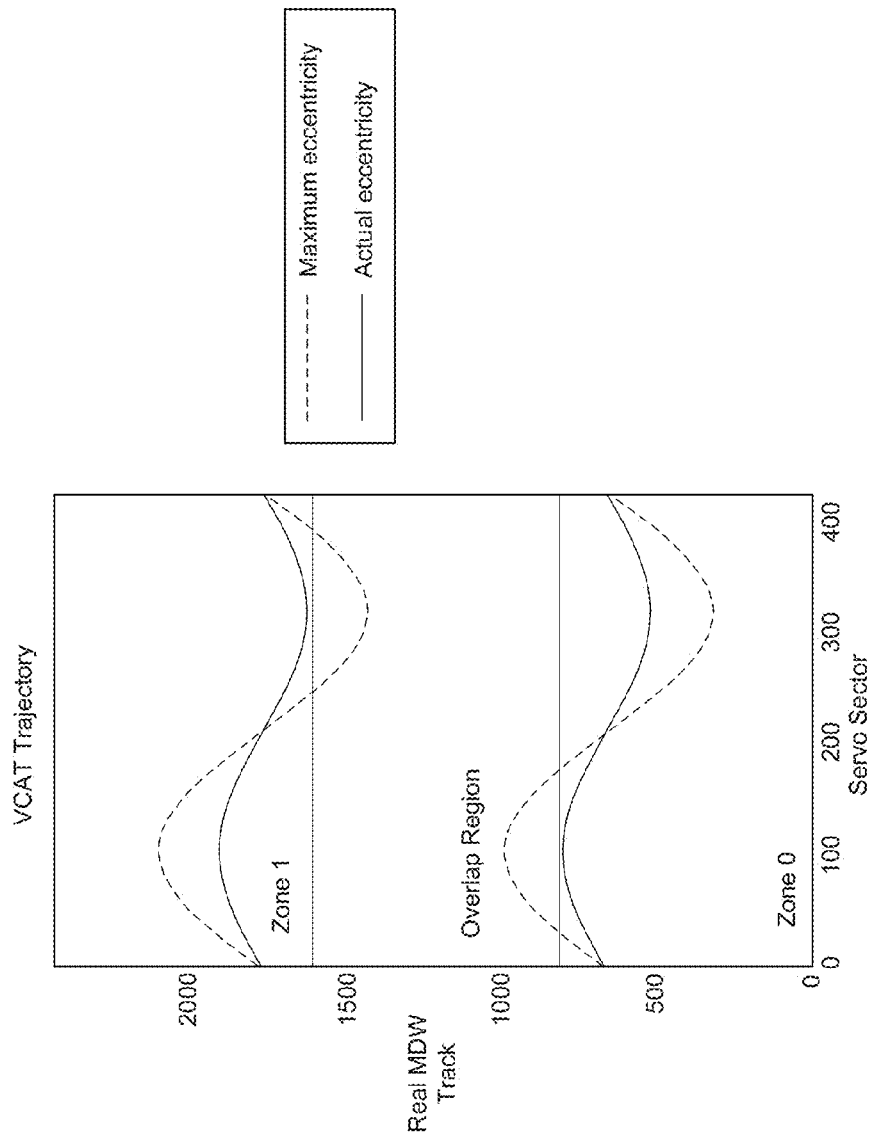
FIG. 10 is a chart of a system for writable servo overlap zones, in accordance with certain embodiments of the present disclosure.

FIG. 10 shows another example of a system employing writable servo zone overlap regions. In the example of FIG. 10, the max possible eccentricity as well as the actual eccentricity of virtual track trajectories is shown. In examples where user data is not stored anywhere within the wider or more numerous sequencer sgate periods of overlap zones, the overlap zones may accordingly be slightly less efficient in storage capacity than non-overlap zones. When the size of an overlap zone (e.g. the number of virtual tracks within the zone) is based on a worst-case scenario of virtual track eccentricity (i.e. max eccentricity), the overlap zone may be defined to be large enough to contain all virtual tracks that may cross into an overlap region if they had max eccentricity. However, the actual eccentricity of the virtual tracks may be lower than the max eccentricity. In such a case, the overlap zones may be defined smaller, thereby increasing the overall data capacity of the disc. In the example of FIG. 10, overlap zones based on worst-case eccentricity would need to be large enough to accommodate tracks with the Max eccentricity because those tracks may cross over into the overlap region. Meanwhile, tracks with the actual eccentricity depicted may not cross into the overlap region, and therefore overlap zones based on actual eccentricity would not need to include these tracks. In some embodiments, the actual eccentricity of the tracks may be calculated, and the size of the servo RAP zones may be configured based on the actual eccentricity to improve data storage device capacity.

In an example embodiment, the default servo code may set the 2× sequencer sgate overlap region based on a max 1.2 mil eccentricity (one mil=one thousandth of one inch). Disc eccentricity may then be calculated from VCAT compensation polynomials at each servo zone boundary using calibration tests. The start and stop locations of the overlap zones (e.g. what virtual tracks are included) may be reduced based on the actual measured eccentricity. Final zone parameters may be serpent aligned and written to servo adaptive parameters (SAP) and read/write adaptive parameters (RAP). SAPs may be used by the servo firmware, and RAPs may be used by controller firmware. Serpents may be smaller subsets of tracks within zones, which may be used during sequential reading or writing, for example.

A drive may maintain a number of tables used identify locations and layouts of tracks and zones on a disc. In some embodiments, the controller firmware may employ a number of these tables for drive operation. In some examples, a track layout and format table can be decoupled from the data zone table. For example, a drive may include a track layout and format table, a data zone table, and a servo zone table, which may all be used by the controller to control drive operation.

Data zone tables may be used by the controller firmware to determine parameters relative to the read/write subsystem for a given area of a disc. For example data zone tables may include metrics such as BPI (bits-per-inch), TPI (tracks-per-inch), data frequency or gaps, etc.

Servo RAP zone tables (which may also be called servo zone tables) may be used by the controller FW to identify boundaries of RAP zones based on number of serpents. Used to identify changes to sequencer sgates. The servo RAP zone table in controller FW may be synchronized with servo super-zone and sub-zone details in SAP during factory calibration. In this way servo FW and controller FW may be in agreement on the actual sequencer sgate width for every logical data track. For example, servo RAP zone tables may contain a number of serpents for each servo RAP zone, along with corresponding sequencer sgate width or spacing, for each head. Serpent information may indicate where the servo RAP zones start and end (e.g. zone boundaries). These zone boundaries may generally not be aligned with data zone boundaries. As shown in FIGS. 6a, 7a and 8, the servo sub-zone boundaries may correspond to the servo RAP zone boundaries, but the servo super-zone boundaries may not be needed by controller firmware and may only be tracked by the servo firmware. The information in the servo RAP zone table may allow controller firmware to know where sgate width changes on the disc, but not which servo pattern (super zone) is being actively demodulated (e.g. using the channel sgate) by the servo FW. This may allow track layout and track capacity to change at specific points inside any data zone. For example, sgate widths could change at discrete serpents independent of the data zone table. Accordingly, the track layout for any given track could be a function of both the data zone table and the servo RAP zone table.

Track layout and format tables may be used by controller FW to determine details relevant to low level track layout, such as: data sectors per track, sector size (symbols), start and stop serpents for each region, etc. As stated, this table may be synthesized from the data zone table and servo RAP zone table, for example during power-on initialization in controller FW.

An example of an expected drive system interaction may be described as follows. A disc may be formatted by a multi-disc writer (MDW). Zone start, stop, and overlaps, as well as timing offsets, may be specified in the MDW specification material.

At the device servo level, servo code may compile in physical track locations corresponding to servo pattern frequency switches based on zone. Timing offset between patterns may be well controlled and may be also compiled into servo code. Factory tests may measure track DC offset at zone transitions and can save the results to servo adjustable parameters (SAP). Servo code may apply this virtual offset to patch the zone position seamlessly. After MDW calibrations, a factory test can find the closest serpent number that corresponds to servo zone switch and used for serpent alignment (e.g. adjust the serpent sub-regions of the zones to correspond with zone transitions). This may be recorded in SAP and RAP for each zone transition.

At the read/write channel level, a zone table can be set up based on expected track layout changes at some nominal serpent locations. At the controller firmware level, servo zone info from RAP can be read up and used to determine track layout. The controller may use data from the discussed tables for timing of read, write, and seeking operations and control of transducer heads.

Figure 11:
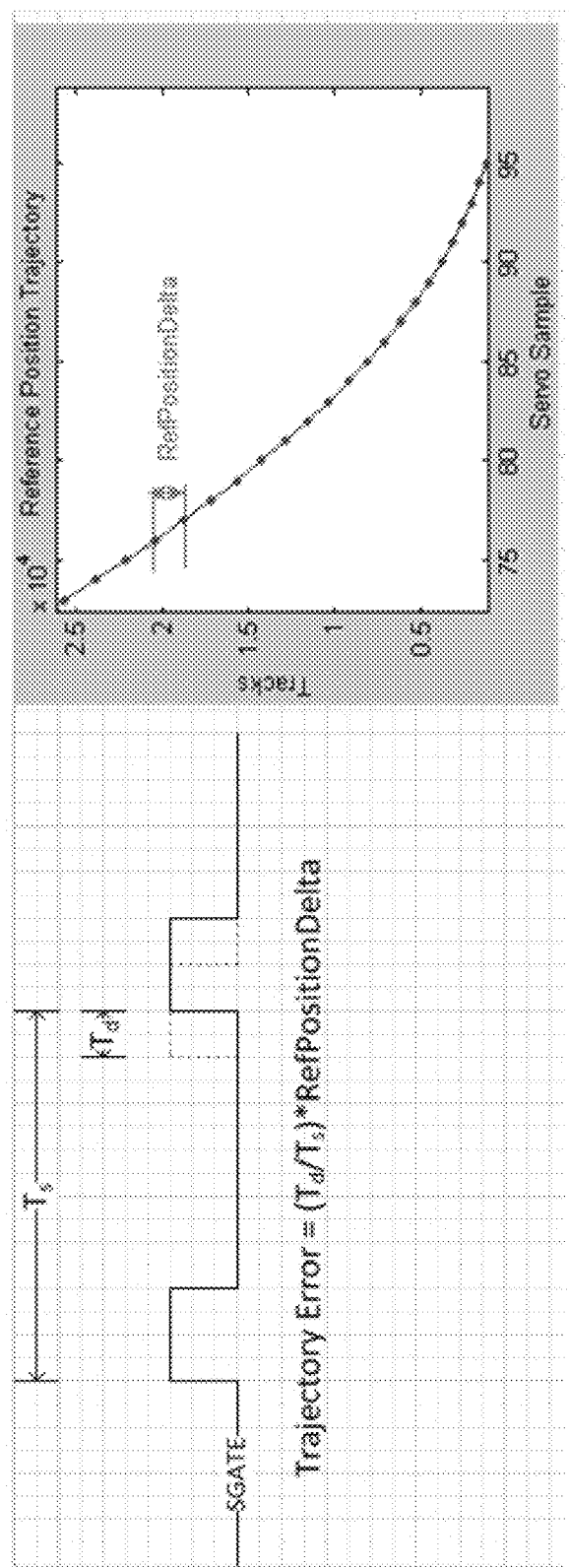
FIG. 11 is a chart of a system for writable servo overlap zones, in accordance with certain embodiments of the present disclosure.

Seeking operations will be discussed with reference to FIG. 11. FIG. 11 depicts example diagrams of a system employing writable servo zone overlap regions. Channel and sequencer sgate periods may be modified for one sector when seeking across a servo super-zone boundary, where the servo pattern frequency may change. This may lead to seek trajectory errors, with an amount of error depending on the velocity of the head movement. An error may arise because the pattern frequency currently being used by the servo system (e.g. from the zone being transitioned out of) may not match the sample period of the other zone (e.g. the zone being transitioned into). This may create an error in the expected position as compared to the position had the switching of patterns not been made. This error may make the servo system believe it is not following the seek reference position (nominal position trajectory) correctly, and can introduce a large DC error step into the servo seeking position feedback controller.

Rather than allow this error to happen, the error may be hidden from the position feedback controller and propagated back into the feedback loop at a controlled rate to minimize transient disturbances and seek acoustics. The hiding of the error may occur in the calculation of the expected seek trajectory. The sgate period delta (Td) may be known for each servo super zone transition. With this information the servo code may implement a hide and feed system (discussed herein) to compensate for the trajectory error. In some embodiments, an error may be avoided by a control scheme using a different sample period for the exact moment of the switch in sgate location, but such an implementation may be much more complex and costly from a processor resource point of view. The error compensation described herein may be more hardware and code friendly.

A compensation algorithm, which may be referred to as "hide and feed," can be added to the servo code to reduce the impact of the change in sgate period. The drive can calculate the expected amount of trajectory error one servo sample before the switch in pattern frequency (e.g. when a zone switch is approaching that will result in a sgate period change)

based on a known sample period adjustment. This compensation can hide the trajectory error from the seek process temporarily, and slowly feed the hidden error into the servo loop, for example by using a fixed ramp rate to introduce a fraction of the period change at each sample. This can prevents an abrupt step from being presented to a seek controller. The rate of ramp back into the loop may be controlled by a tunable variable, for example 0.333 tracks per sample.

For example, the amount of trajectory error anticipated during a seek between zones may be calculated as:

Trajectory Error=$(T_d/T_s)$*RefPositionDelta, $T_s$ may be the nominal sgate period. $T_d$ may be the time period delta experienced when switching from one servo pattern (super zone) to the next servo pattern (super zone) during a seek. RefPositionDelta may be the nominal seek reference position sample delta that would occur on the next sgate if no super zone switch was occurring. The equation can predict the position error due to the sample period modulation, and can be used to hide the position error from the position feedback loop. A portion of this error may then be fed back into the loop at each subsequent sgate until it reaches zero. This can minimize step and transient disturbances to the seeking controller.

For example, the calculation may be performed one sample before the zone switch occurs, and the hiding may occur on the next sample, the first sample after zone switch. After the zone switch occurs, a fraction of the error may be feed back into the loop (un-hidden) over a number of samples until it reaches zero. For example, at the first sample after the zone switch, two thirds of the calculated trajectory error could be hidden from the position feedback loop, with one third revealed at the following sample, and the final third revealed at the next sample.

Because the amount of error may depend on the velocity of the head movement, the algorithm to hide and feed in the error may account for head velocity at the expected zone transition. For example, it may feed the error in over a larger number of sectors at high velocity.

Figure 12:
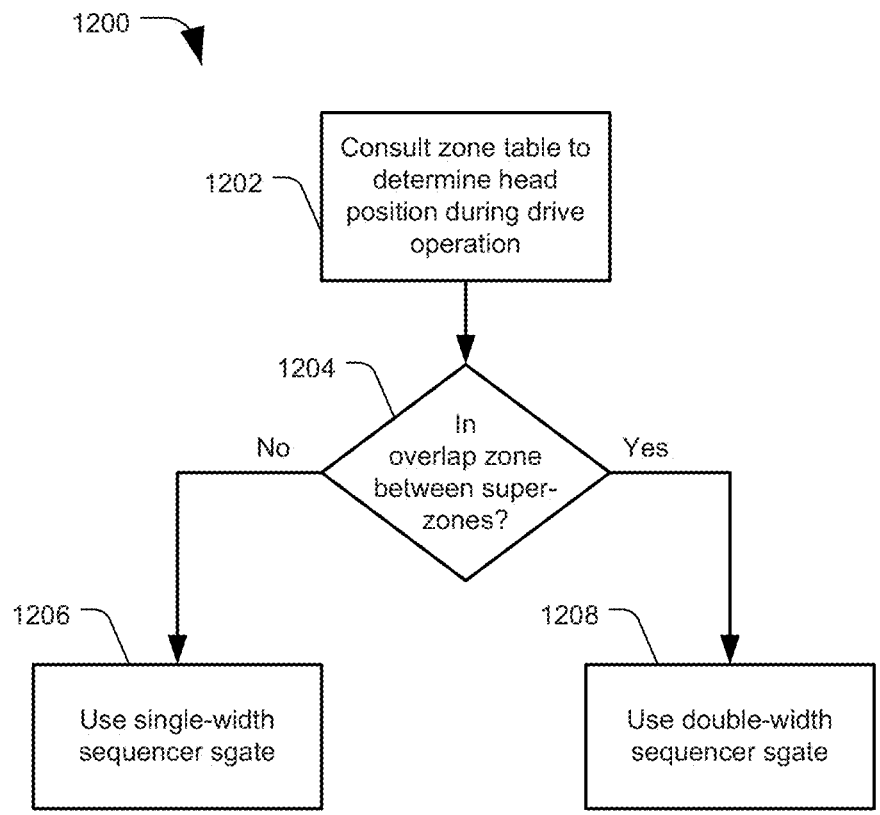
FIG. 12 is a flowchart of a method for writable servo overlap zones, in accordance with certain embodiments of the present disclosure.

Turning now to FIG. 12, a flowchart of an example method for cache data value tracking, generally designated 1200. The method 1200 may comprise consulting a zone table to determine the position of a transducer head over a disc memory during drive operation, at 1202. For example, the table may be consulted to determine a servo RAP zone over which the head is located. A determination may be made as to whether the head is in an overlap zone between servo super-zones, at 1204. For example, if a disc has N servo super-zones, the disc may have 2N–1 servo RAP zones, with N–1 overlap zones between the N non-overlap zones. The overlap zones may represent a number of virtual tracks of the disc, where the path of the virtual tracks in the overlap zone may pass through servo patterns of more than one servo super-zone.

If the head is not located in an overlap zone at 1204, the method may comprise using a single-width sequencer sgate when seeking and track following, at 1206. This may be because the head is in a non-overlap zone, and will only include a single predictable servo pattern period, requiring a single-width sequencer sgate corresponding to the single set of servo patterns. If the head is located in an overlap zone at 1204, the method may comprise using a double-width sequencer sgate, at 1208. Virtual tracks within overlap zones may have more than one servo pattern in a period, such as two patterns immediately adjacent to each other. A double-width sequencer sgate may be used to ensure that no servo pattern data is overwritten by other data during drive operation. A double-width sgate may, for example, have a width equal to the combined widths of sgates in the two zones adjacent to the overlap zone. In some embodiments, other sgate patterns may be used instead of double-width sgates. For example where the servo patterns of the adjacent super-zones are not circumferentially adjacent to each other within the overlap zone, such as in FIGS. 5b and 7a, sequencer sgates for overlap zones may include a combination of sgate patterns for the two adjacent non-overlap zones, as shown in FIG. 7b.

Figure 13:
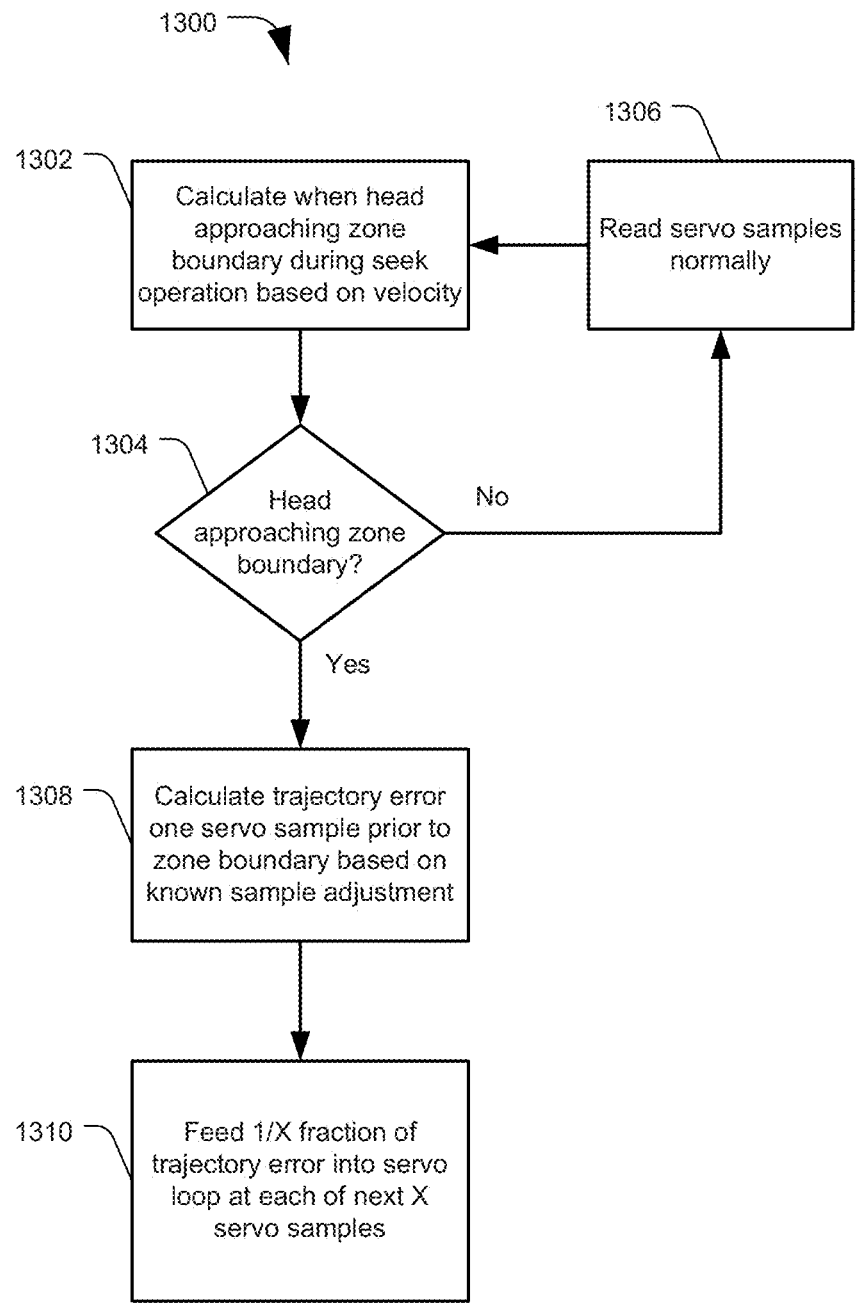
FIG. 13 is another flowchart of a method for writable servo overlap zones, in accordance with certain embodiments of the present disclosure.

FIG. 13 depicts another flowchart of an example method for cache data value tracking, generally designated 1300. The method 1300 may comprise calculating when a transducer head is approaching a zone boundary during a seek operation based on a velocity of the head over a disc memory, at 1302. At 1304, the method may comprise determining whether the head is approaching a zone boundary. For example, a drive may be able to determine when a head is approaching a boundary based on the velocity of the head and a table indicating where servo frequencies may change, e.g. based on a number of tracks or serpents (sets of tracks).

If the head is not approaching a zone boundary at 1304, the method may comprise continuing the seek operation while reading servo samples normally for the current zone, at 1306, and continuing to monitor for approaching zone changes at 1302. If the head is approaching a zone boundary at 1304, the method may comprise calculating an expected trajectory error one servo sample prior to the zone switch based on a known sample adjustment, at 1308. The known sample adjustment may be the time offset between servo patterns or zones known by the servo code and used at zone switch. In some embodiments, the servo code may include information on which servo sample is being switched to, and can calculate the effect as described in relation to FIG. 11. For example, the channel sgate period may change between zones, which can lead to a seek trajectory error. The seek trajectory error may be calculated early based on the known zone boundaries and the channel sgate period for each zone.

The method 1300 may involve feeding a fraction of the calculated trajectory error into the servo loop at a regular rate, at 1310. For example, a 1/X fraction of the trajectory error may be introduced over the next X servo sample readings (e.g. ⅓ of the error over the next 3 servo samples). This can prevent an abrupt or large error from being presented to the servo seek position feedback controller.

In accordance with various embodiments, the methods described herein may be implemented as one or more software programs running on a computer processor or controller device. In accordance with another embodiment, the methods described herein may be implemented as one or more software programs running on a computing device, such as a personal computer that is using a data storage device such as a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device storing instructions that when executed cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a controller configured to:
        determine a first servo gate (sgate) timing for a first overlap zone including servo patterns of a first servo super zone and servo patterns of a second servo super zone of a data storage medium, the first sgate timing based on servo pattern timing for the first servo super zone and the second servo super zone; and
        initiate writing user data to the first overlap zone based on the first sgate timing.

2. The apparatus of claim 1 further comprising:
    the data storage medium including:
        N servo super zones including the first servo super zone and the second servo super zone, N being a positive integer greater than or equal to two, the servo super zones including a plurality of tracks and having servo patterns.

3. The apparatus of claim 2 further comprising:
    the controller configured to initiate writing data according to virtual zones, the virtual zones including:
        N−1 overlap zones located at boundaries of adjacent servo super zones, including the first overlap zone, each overlap zone including a number of tracks from both adjacent servo super zones; and
        N non-overlap zones corresponding to the N servo super zones, the non-overlap zones including tracks from the plurality of tracks not included in the overlap zones.

4. The apparatus of claim 3 further comprising:
    the controller further configured to initiate writing to the virtual zones based on sgate timing for each virtual zone, the sgate timing based on:
        for the non-overlap zones, the servo super zone servo pattern timing; and
        for the overlap zones, the combined sgate timing of both adjacent non-overlap zones.

5. The apparatus of claim 4 further comprising:
    servo patterns include radially-oriented servo tracks;
    servo tracks of the first servo super zone are circumferentially offset from servo tracks of the second servo super zone within the first overlap zone; and
    the controller is configured to determine the first sgate timing as including sgates circumferentially aligned with servo tracks of the first servo super zone and sgates circumferentially aligned with servo tracks of the second servo super zone.

6. The apparatus of claim 4 further comprising:
    servo patterns include radially-oriented servo tracks;
    servo tracks of the first servo super zone are circumferentially offset from and adjacent to servo tracks of the second servo super zone within the first overlap zone; and
    the controller is configured to determine the first sgate timing as including sgate widths equal to an sgate width of the first servo super zone plus an sgate width of the second servo super zone.

7. The apparatus of claim 2 further comprising:
    the data storage medium comprises a disc memory; and
    the plurality of tracks comprise virtual tracks substantially concentrically aligned with an axis of rotation of the disc memory and not only defined by servo patterns recorded on the data storage medium.

8. The apparatus of claim 7 further comprising:
    each overlap zone includes a number of virtual tracks which include servo patterns from more than one servo super zone.

9. The apparatus of claim 8 further comprising:
    the number of virtual tracks in overlap zones is set based on how many virtual tracks would include servo patterns from more than one servo super zone if the virtual tracks had a set maximum eccentricity value, maximum eccentricity value based on a possible difference between paths of virtual tracks and paths of real tracks defined by servo patterns recorded on the data storage medium.

10. The apparatus of claim 8 further comprising:
    the number of virtual tracks in overlap zones is set based on how many virtual tracks include servo patterns from more than one servo super zone calculated from an actual eccentricity value of the virtual tracks, actual eccentricity value based on an actual difference between paths of the virtual tracks and paths of real tracks defined by servo patterns recorded on the data storage medium.

11. The apparatus of claim 1 comprising the controller further configured to:
    control movement of a transducer head over the data storage medium, including:
        determining when the transducer head will enter the first overlap zone;
        determining a trajectory error based on a change in servo pattern frequency between the first servo super zone and the second servo super zone; and
        providing a portion of the trajectory error into a servo feedback loop for selected servo sampling points.

12. A device comprising:
    a disc data storage medium including:
        N servo super zones including a first servo super zone and the second servo super zone, N being a positive integer greater than or equal to two, the servo super zones including a plurality of tracks and having servo patterns;
    a controller configured to:
        determine a first servo gate (sgate) timing for a first overlap zone including servo patterns of the first servo super zone and servo patterns of the second servo super zone, the first sgate timing based on servo pattern timing for the first servo super zone and the second servo super zone; and
        initiate writing user data to the first overlap zone based on the first sgate timing.

13. The device of claim 12 further comprising:
    servo patterns of each servo super zone overlap adjacent servo super zones such that each track of each servo super zone includes the servo pattern of the track's own servo super zone and a servo pattern of an adjacent servo super-zone; and the controller configured to determine sgate timing for N overlap zones based on servo pattern overlap of the N servo super zones.

14. The device of claim 13 further comprising:
the controller further configured to initiate writing to each track of the overlap zones based on sgate timing for each track, the sgate timing based on the servo pattern frequency of the tracks own super zone and a servo pattern frequency of an adjacent servo super-zone.

15. The device of claim 12 further comprising:
servo patterns include radially-oriented servo tracks;
servo tracks of the first servo super zone are circumferentially offset from and adjacent to servo tracks of the second servo super zone within the first overlap zone; and
the controller is configured to determine the first sgate timing as including sgate widths approximately equal to twice an sgate width of a servo super zone adjacent to the overlap zone.

16. The device of claim 12 further comprising:
the plurality of tracks include virtual tracks substantially concentrically aligned with an axis of rotation of the disc data storage medium and not only defined by servo patterns recorded on the disc data storage medium; and
the number of virtual tracks in overlap zones is set based on how many virtual tracks can include servo patterns from more than one servo super zone due to an eccentricity value of the virtual tracks, the eccentricity value based on a difference between paths of the virtual tracks and paths of real tracks defined by servo patterns recorded on the data storage medium.

17. The device of claim 12 comprising the controller further configured to:
control movement of a transducer head over the disc data storage medium, including:
determining when the transducer head will cross from the first servo super zone to the second servo super zone;
calculating a trajectory error prior to the crossing, the trajectory error due to a change in servo pattern frequency between the first servo super zone and the second servo super zone; and
providing a fraction 1/X of the trajectory error into a servo feedback loop for each of a following X servo sampling points, X being a positive integer.

18. A device comprising:
a disc data storage medium including a first servo super zone and a second servo super zone, the servo super zones including a plurality of tracks and having servo patterns;
a controller configured to:
control movement of a transducer head over the disc data storage medium, including:
determining when the transducer head will cross from the first servo super zone to the second servo super zone;
calculating a trajectory error prior to the crossing, the trajectory error due to a change in servo pattern frequency between the first servo super zone and the second servo super zone; and
providing 1/X of the trajectory error into a servo feedback loop for a following X servo sampling points, X being a positive integer.

19. The device of claim 18 comprising the controller further configured to:
determine a first servo gate (sgate) timing for a first overlap zone including servo patterns of the first servo super zone and servo patterns of the second servo super zone, the first sgate timing based on servo pattern timing for the first servo super zone and the second servo super zone; and
initiate writing data to the first overlap zone based on the first sgate timing.

20. The device of claim 19, the controller further configured to initiate writing data to virtual zones based on sgate timing for each virtual zone, the virtual zones including:
N servo super zones, N being a positive integer greater than or equal to two;
N−1 overlap zones located at boundaries of adjacent servo super zones, including the first overlap zone, each overlap zone including a number of tracks from both adjacent servo super zones;
N non-overlap zones corresponding to the N servo super zones, the non-overlap zones including tracks from the plurality of tracks not included in the overlap zones;
the sgate timing based on:
for the non-overlap zones, the servo super zone servo pattern timing; and
for the overlap zones, the combined sgate timing of both adjacent non-overlap zones.

* * * * *